(12) United States Patent
Newton et al.

(10) Patent No.: US 7,841,735 B2
(45) Date of Patent: *Nov. 30, 2010

(54) RECHARGEABLE FLUORESCENT TASK LAMP

(75) Inventors: James Newton, Arlington, TX (US);
Bijan Bayat, Plano, TX (US)

(73) Assignee: Bayco Products, Ltd., Wylie, TX (US)

( * ) Notice: Subject to any disclaimer, the term of this patent is extended or adjusted under 35 U.S.C. 154(b) by 128 days.

This patent is subject to a terminal disclaimer.

(21) Appl. No.: 12/200,097

(22) Filed: Aug. 28, 2008

(65) Prior Publication Data
US 2008/0310148 A1     Dec. 18, 2008

Related U.S. Application Data

(62) Division of application No. 10/837,437, filed on Apr. 30, 2004, now Pat. No. 7,434,953.

(60) Provisional application No. 60/467,649, filed on May 2, 2003, provisional application No. 60/467,981, filed on May 5, 2003.

(51) Int. Cl.
*F21S 4/00* (2006.01)
*F21L 4/00* (2006.01)

(52) U.S. Cl. ..................... 362/183; 362/221
(58) Field of Classification Search ............... 362/158, 362/183, 223, 275, 285, 396, 220, 221
See application file for complete search history.

(56) References Cited

U.S. PATENT DOCUMENTS 6,118,228 A * 9/2000 Pal ........................ 315/307

* cited by examiner

*Primary Examiner*—John A Ward
(74) *Attorney, Agent, or Firm*—Whitaker, Chalk, Swindle & Sawyer, LLP; Stephen S. Mosher

(57) ABSTRACT

A battery operated fluorescent lamp is disclosed, which is operable from the battery while the battery is being recharged, comprising a tubular housing configured as a handle grip at one end and a cylindrical lens portion at the other end. The tubular housing lockably connects to a battery pack. The cylindrical 3030 lens portion encloses a miniature fluorescent bulb. The electrical circuitry, enclosed within the handle grip and alternately operable from either 120 VAC or 12 VDC, includes a converter circuit, a battery charging circuit, and a fluorescent lamp ballast circuit. The battery pack is electrically coupled to simultaneously receive charging current from an output of the charging circuit and to deliver DC supply voltage to the fluorescent lamp ballast circuit without the occurrence of a net discharge of the battery pack.

19 Claims, 5 Drawing Sheets

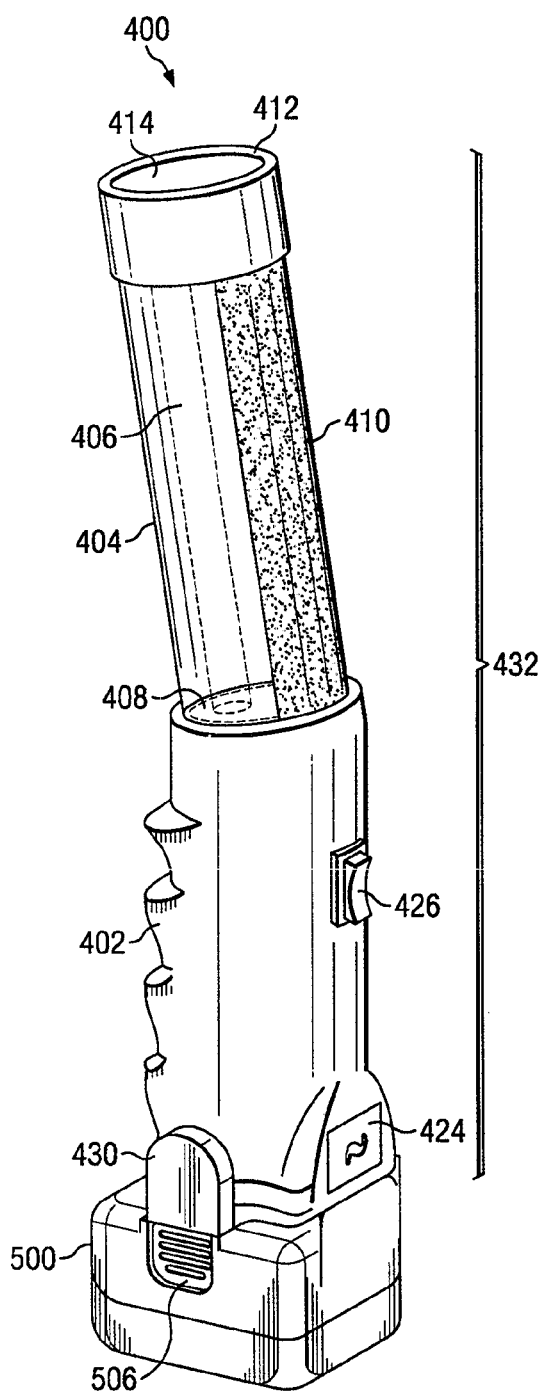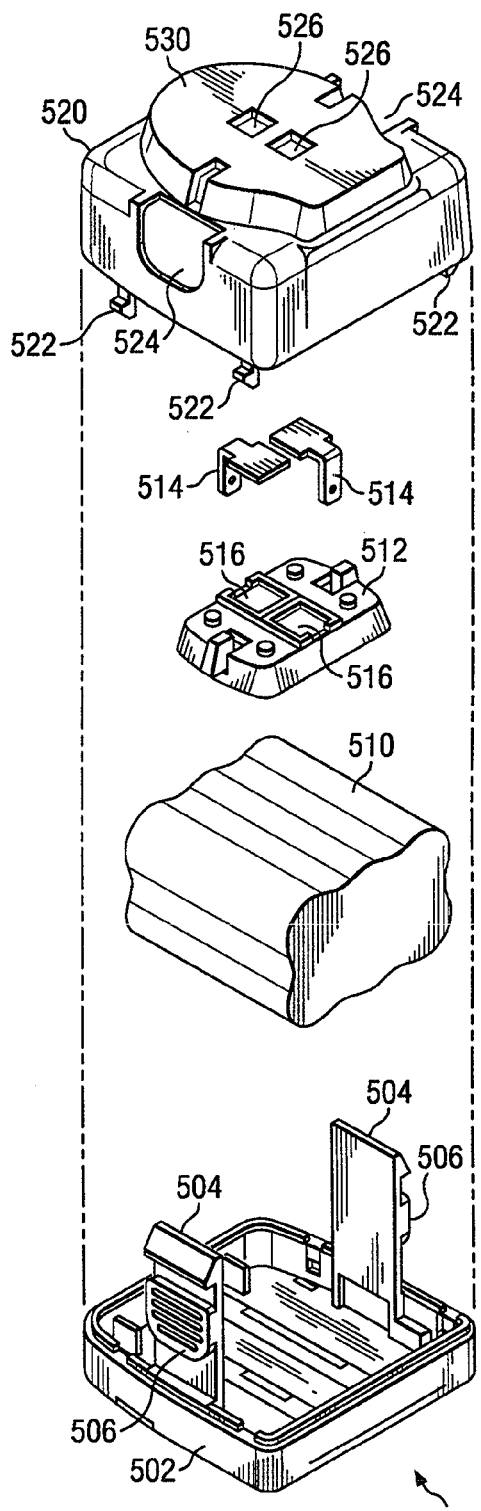
FIG. 5
FIG. 6

RECHARGEABLE FLUORESCENT TASK LAMP

CROSS REFERENCE TO RELATED APPLICATIONS

This patent application is a divisional application from U.S. patent application Ser. No. 10/837,437, filed Apr. 30, 2004 now U.S. Pat. No. 7,434,953, entitled "Rechargeable Fluorescent Task Lamp."

The present U.S. Patent Application claims priority from earlier filed U.S. Provisional Patent Application Ser. No. 60/467,649 filed May 2, 2003 and entitled "Integrated Circuit For Task Light," and Ser. No. 60/467,981 filed May 5, 2003 and entitled "Electrical Circuit For A Portable Fluorescent Task Lamp."

BACKGROUND OF THE INVENTION

1. Field of the Invention

The present invention generally relates to battery operated lamps and, more particularly, to battery operated fluorescent lamps having built-in battery recharging capability and operable from either a 120 VAC or 12 VDC source of power.

2. Description of the Prior Art

Portable incandescent lamps, which operate by using an electric current to heat a filament, have been readily available for use as flashlights, task lights or work lights (e.g., 'drop' lights), camp lights, and the like. While generally reliable and reasonably durable, incandescent lamps are inefficient, whether operated from AC or DC voltage sources. Further, battery operated incandescent lamps are generally limited in the amount of light output because of the inefficiency of heated filament technology. Other disadvantages of incandescent lamps include the susceptibility of filaments to breakage and the heat produced, which can be uncomfortable when used in close quarters.

Portable fluorescent lamps have also been readily available for use as flashlights, task lights or work lights (e.g., 'drop' lights), camp lights, and the like. As is well known, fluorescent lamps are relatively efficient compared to incandescent lights, but they require a ballast device of some type to provide both a high starting voltage to ionize the gas within the bulb and a current-limiting impedance to limit the current flowing between the lamp terminals after the gas becomes ionized and highly conductive. In conventional AC operated fluorescent lamps the ballast device is a relatively large, heavy inductor in series with the fluorescent bulb. The large inductor provides a high back EMF when the alternating supply current reverses in the inductor, which causes a high starting voltage to ionize the gas within the bulb. The large inductance also provides a substantial impedance to the flow of current through the bulb after the ionization takes place.

In conventional portable fluorescent lamps, a small fluorescent bulb rated at, e.g., four watts, can be illuminated effectively with a battery voltage of 7.5 to 9.0 volts and a small step-up converter circuit to produce the relatively high starting voltage required. For such a low power rating, the inductance required to limit the current after ionization is correspondingly small enough to allow a practical battery operated fluorescent lamp that is not too bulky or heavy. However, fluorescent bulbs rated at four watts or even six watts do not provide much more light than a typical seven watt incandescent night light. Further, at 7.5 volts DC, the five large, C or D-cell alkaline batteries typically used in such lamps, which may provide up to one hour of illumination between battery replacement or recharging, causes the lamp to be bulky and heavy.

There are higher rated fluorescent bulbs available, such as a 13 watt Compact Fluorescent Lamp (CFL) Bi-Pin bulb. Such a bulb provides much higher light output but requires that more power be delivered by the ballast circuit. With conventional technology, this requirement demands a larger ballast circuit and further limits the battery life. While battery technology is continually improving, 13 watt, battery powered, portable fluorescent lamps, to be practical to use, must rely on rechargeable batteries. Typically, the lamp, in order to keep the size and weight within practical limits, contains only the batteries, the bulb, and an electronic ballast circuit. After a relatively short duration of use, typically one hour, the batteries must be replaced or recharged on an external battery charger A typical external battery charger may have substantial bulk and weight, especially if it operates from a standard wall outlet of 120 VAC. There is currently no known portable fluorescent lamp available that includes the batteries, ballast, and bulb that also includes a built-in AC-DC converter and battery charger in a compact, flashlight-sized, light-weight package.

What is needed is a higher efficiency, 13 watt portable fluorescent lamp that includes a built-in battery charger and operates off of either 120 VAC or 12 VDC power, yet is compact and light weight, i.e., approximately the size and weight of a conventional flashlight powered by two or three "D" cells. Further, the portable fluorescent lamp must be as easy to handle as a flashlight—i.e., have all the electronics and the battery pack housed in an enclosure approximately the same size as the handle portion of a conventional "D" cell flashlight having two cells. The design must accordingly produce very little heat so that it may be comfortably held by the handle that encloses the electronics. The handle must be small enough in diameter to hold easily and securely in the average-sized person's hand. Further, the battery charger built-in to the handle must be efficient enough to recharge the battery pack in under 90 minutes while the portable lamp is in use.

SUMMARY OF THE INVENTION

Accordingly, there is disclosed a 13 watt, battery operated, portable fluorescent lamp that is provided by the advancement in technology of the present invention. The lamp comprises a tubular housing configured as a handle grip portion at one end and a cylindrical lens portion at the other end. The tubular housing lockably connects to a compact battery pack. The cylindrical lens portion encloses a miniature, 13 watt fluorescent bulb. The electrical circuitry, enclosed within the handle grip and alternately operable from either 120 VAC or 12 VDC, includes a converter circuit, a battery charging circuit, and a fluorescent lamp ballast circuit. The compact battery pack is electrically coupled to the charger and ballast circuits and configured to simultaneously receive charging current from an output of the charging circuit and to deliver DC supply voltage to the fluorescent lamp ballast circuit during use of the lamp without the occurrence of a net discharge of the battery pack.

BRIEF DESCRIPTION OF THE DRAWINGS

FIG. 5 illustrates a pictorial view of one embodiment of a portable fluorescent lamp according to the present invention;

FIG. 6 illustrates an exploded pictorial view of one embodiment of a battery pack for use with the portable fluorescent lamp of FIG. 5;

DETAILED DESCRIPTION OF THE INVENTION

Figure 1:
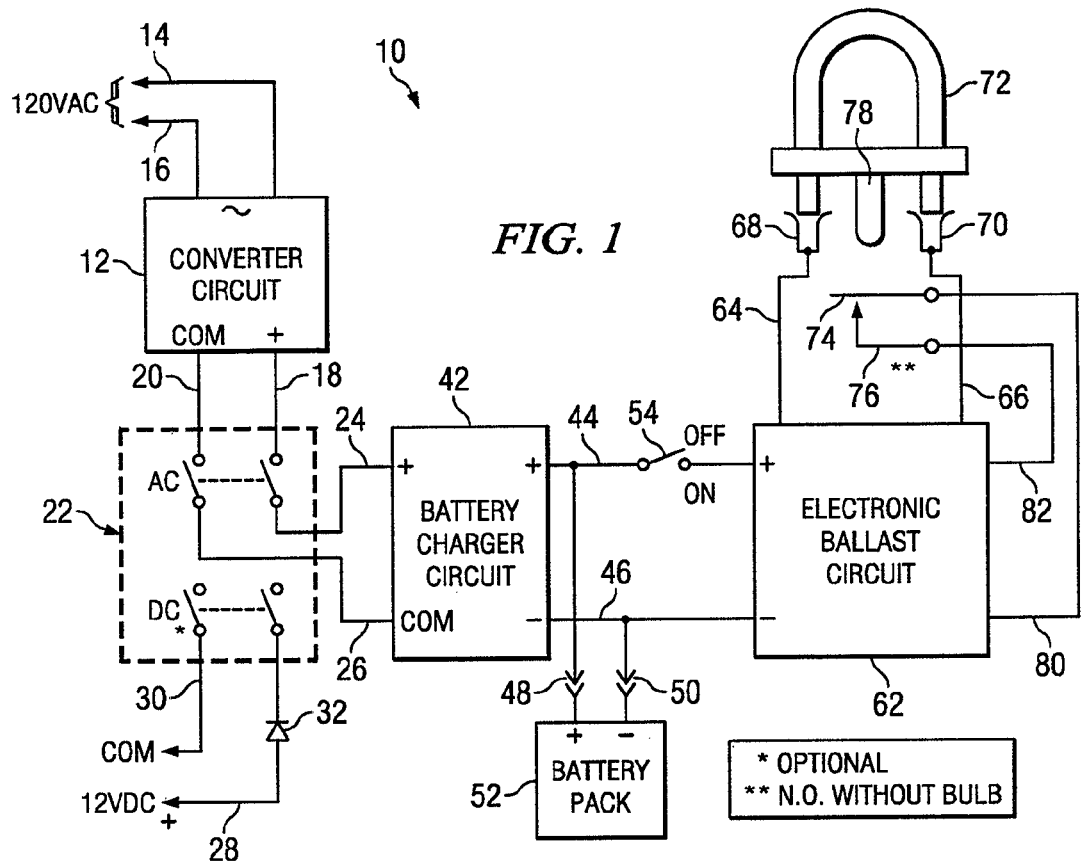
FIG. 1 illustrates a block diagram of one embodiment of a portable fluorescent lamp according to the present invention.

Referring to FIG. 1, there is illustrated a block diagram of one embodiment of the electrical circuitry for a portable fluorescent lamp 10 according to the present invention. The principal components of the electrical circuitry for the lamp 10 include a converter circuit 12, a battery charger circuit 42, a battery pack 52, an electronic ballast circuit 62, and a miniature fluorescent bulb 72. The battery charger 42 may be operated from either a 120 VAC voltage source or a 12 VDC voltage source. The converter circuit 12 receives the 120 VAC via lines 14, 16, which may terminate in a receptacle (not shown) that mates with a matching plug of an AC line cord (not shown). The converter produces an output voltage of approximately 13 volts DC under load on lines 18,20, which terminate at the terminals of one side of a DPDT switch 22. When the wiper contacts of the switch 22 are in the "AC" position, the lines 18, 20 are connected to the lines 24, 26, which connect to the +12 volt and the common (COM) input terminals respectively of the battery charger circuit 42. Thus, in the "AC" position, the switch 22 couples the converter circuit 12 between the 120 VAC voltage source and the input to the battery charger circuit 42.

Alternatively, the battery charger circuit may be operated directly by a 12 VDC voltage source via lines 28, 30, which may terminate in a receptacle (not shown) that would mate with a matching plug of a DC line cord (not shown), and connect to the terminals of the other side of the DPDT switch 22. When the wiper contacts of the switch 22 are in the "DC" position, the lines 28, 30 are connected to the lines 24,26, which connect to the +12 volt and the common (COM) input terminals respectively of the battery charger circuit 42. Thus, in the "DC" position, the switch 22 couples the lines 28, 30 between the 12 VDC voltage source and the input to the battery charger circuit 42. (Note: the 12 volt source rating is a nominal rating and may, in the case of an automotive battery, actually be in the range of 12.6 to 14.8 volts). A diode 32, is inserted in series with the line 28 as a protective feature to prevent damage that may result from a reversed polarity DC voltage being applied to the electrical circuitry. The switch 22 is an optional feature. In some versions of the portable fluorescent lamp 10, the lines 18, 24, and 28 are tied together and the lines 20, 26, and 30 are tied together. The control of which voltage source is used may then be determined by which line cord is connected between the voltage source and the portable fluorescent lamp 10. Alternatively, the connections for an external 12 VDC source may be deleted, or, the connections for the 120 VAC source and the converter circuit itself may be deleted. Either alternate may be provided to accommodate particular product variations. It will also be appreciated that a portable fluorescent lamp having a built-in battery charger and battery pack in a small, light weight package is a combination not commonly found in the prior art.

Continuing with FIG. 1, the battery charger circuit 42 produces a DC voltage suitable for charging the battery pack 52. In the illustrative embodiment described herein, the output voltage is approximately 7.2 volts DC for charging a battery pack 52 containing six 1.2 volt, rechargeable nickel-metal-hydride (NiMH) cells. In the illustrated embodiment, the six NiMH cells are AA size, rated at 2200 milliAmpere-hours capacity, to provide sufficient power (approximately 15.8 watts) to drive a 13 watt miniature fluorescent lamp bulb to full brightness. This battery configuration was chosen for its compactness, and persons skilled in the art will appreciate that the portable fluorescent lamp 10 of the present invention operates with an efficiency exceeding 80%. The reasons for this high efficiency will become apparent in the detailed description which follows. It will also be understood that other battery configurations are certainly feasible and are contemplated for other similar applications. In the illustrated embodiment, the 7.2 volts output voltage is applied to the lines 44,46, which couple the output of the battery charger circuit 42 to the battery pack 52 via terminals 48, 50 for charging the battery pack 52, and to the input terminals of the electronic ballast circuit 62. A switch 54, connected in series with the line 44, functions as an ON-OFF switch for the portable fluorescent lamp 10. The terminals 48, 50 may be separate contacts located on the housing (not shown in FIG. 1) of the portable fluorescent lamp 10 or they may be incorporated into a connector mounted on the housing of the portable fluorescent lamp 10.

Continuing with FIG. 1, it is appreciated that the electronic ballast circuit 62 operates on the same voltage, in this case approximately 7.2 volts, that is applied to the battery pack 52. The fluorescent ballast circuit produces a high voltage waveform output of approximately 400 Volts AC and approximately 30 KHz for "starting" the fluorescent bulb 72 via lines 64, 66, which couple to terminals 68, 70. The fluorescent bulb 72 is plugged into the terminals 68, 70. After ionization of the gas within the envelope of the fluorescent bulb 72, the electronic ballast circuit 62 limits the current flowing through the fluorescent bulb 72. In an optional feature, a pair of normally open (NO) contacts 74, 76 are connected, via lines 80, 82, in series with the positive voltage line 44 from the battery pack 52 or the battery charger circuit 42, as will be described herein below. The contacts 74, 76 are closed whenever a fluorescent bulb 72 is plugged into the terminals 68, 70 by the action of the barrier 78 on the pin base of the fluorescent bulb 72. The terminals 68, 70 may be part of a receptacle connector. These contacts provide a safety feature that limits access to the high voltage that may be present at the terminals 68, 70, when a bulb 72 is not plugged into the terminals 68, 70.

Figure 2:
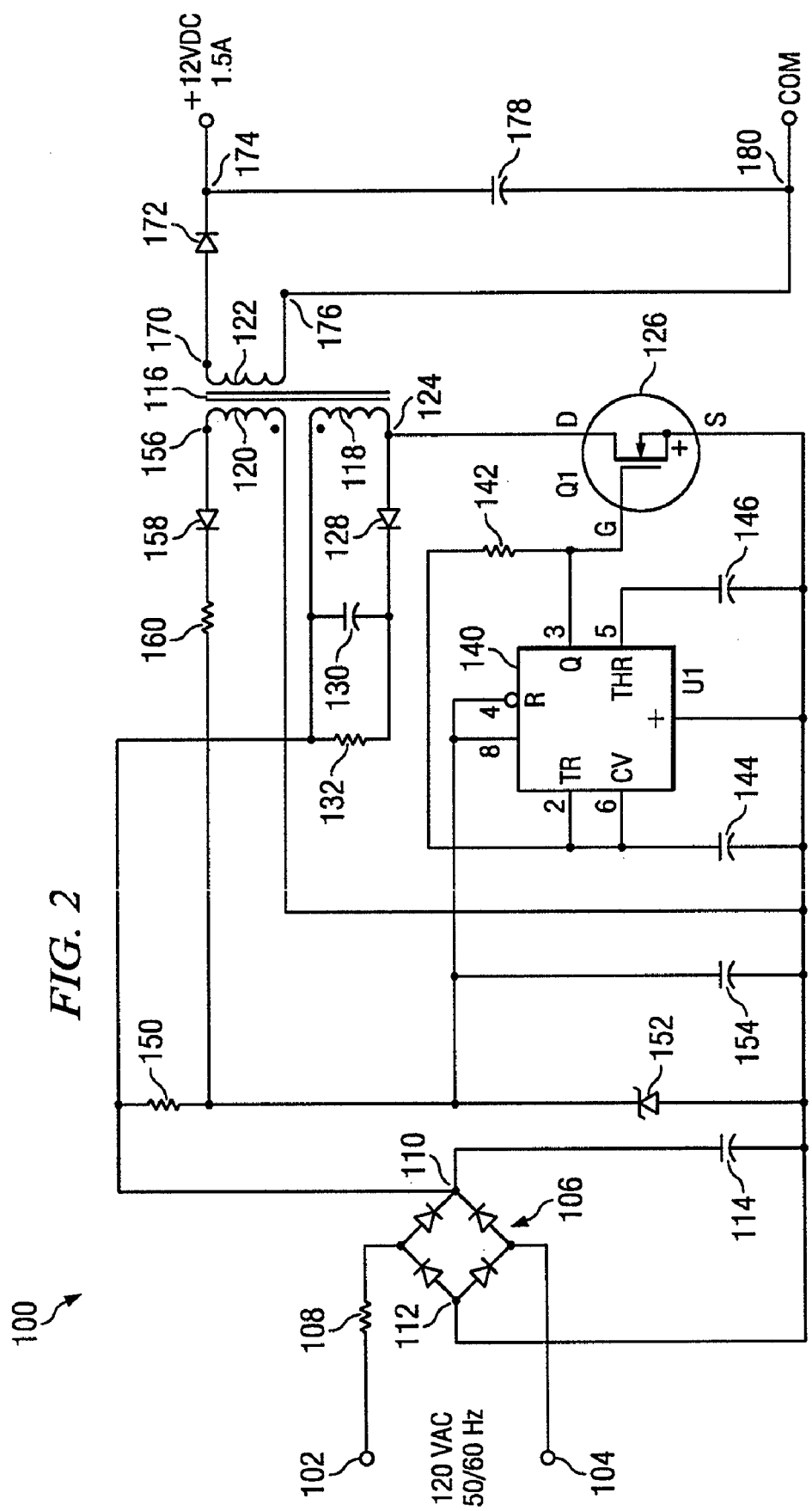
FIG. 2 illustrates an electrical schematic diagram of one embodiment of a converter circuit that may be used in the portable fluorescent lamp of FIG. 1.

Referring to FIG. 2, there is illustrated an electrical schematic diagram of one embodiment of a converter circuit 100 that may be used in the portable fluorescent lamp of FIG. 1. The converter circuit 100 is configured as a feed forward converter that operates at approximately 50 KHz. and provides a DC output voltage of approximately 13 (+/−1) Volts under load from an input of 120 VAC at 50/60 Hz. The converter converts the low frequency 120 VAC input voltage to a high frequency AC voltage, steps down the AC voltage to a low voltage in the transformer 116, and then rectifies and filters the low voltage to produce the low voltage DC output. The circuit is very efficient because the circuit losses are much smaller at the higher frequency. In FIG. 2, the 120 VAC input is applied to input terminals 102, 104 to a bridge rectifier 106. A series resistor 108 between terminal 102 and the bridge rectifier 106 acts as a fuse. The rectified DC output voltage appears at a positive node 110 and a negative node 112 which is also the return node. A filter capacitor 114 is connected across the DC output at nodes 110, 112. This rectifier circuit supplies approximately 170 VDC to the rest of the converter circuit to be described.

The 170 VDC output of the rectifier is applied across a primary winding 118 of an isolation transformer 116 and a transistor switch 126 in series. In the illustrative embodiment, the transistor switch 126 is a type IRF740 N-channel MOSFET rated at 400 Volts, 6.3 Amps, and having an Rds(on) of <0.55 Ohms. This device is available from STMicroelectronics. One side of the primary winding 118 having the polarity symbol (a dot) is connected to node 110, the positive output of the rectifier bridge 106. The other side of the primary winding 118, at node 124, is connected to the drain terminal of the transistor switch 126. The source terminal of the transistor switch 126 is connected to the return node 112. During operation, the transistor switch 126 is turned on and off at a 50 KHz rate, which periodically charges the primary winding 118 with a pulse of current to produce a 170 Volt peak-to-peak square wave. According to the turns ratio of the transformer 116, a smaller, stepped-down replica of the pulse waveform produced across the primary 118 of transformer 116 appears across the secondary winding 122 of transformer 116. The transistor switch 126 is caused to turn on and off by a pulse control signal applied to the gate terminal of the transistor switch 126 that is supplied from the "Q" output at pin 3 of an integrated circuit timer (timer IC) 140 operated as an a-stable multivibrator or oscillator. The timer IC 140 used in the disclosed embodiment is a standard 555 type timer IC available from a variety of manufacturers. The control signal has a duty cycle of approximately 50%. In the description which follows, the term "integrated circuit" may be abbreviated as "IC."

Operating voltage Vcc for the timer IC 140 is applied to pin 8. Pin 4 of the timer IC 140 is also connected to pin 8. The operating voltage at pin 8 is produced by a dropping resistor 150 and a 12 Volt zener diode 152 connected in series across the 170 VDC output of the rectifier at nodes 110, 112. Capacitor 154 provides some high frequency filtering of the DC voltage supplied by the action of zener diode 152. This simple power supply provides the starting voltage for operating timer IC 140. At other times, the operating voltage for timer IC 140 (Vcc) is provided by a rectified output from a secondary winding 120 of transformer 116 connected between node 156 and the common node 112. The voltage across the secondary winding 120 is rectified by diode 158, filtered by capacitor 154, and applied to pin 8 of the timer IC. The frequency of the a-stable oscillator is set by resistor 142 and capacitor 144. Resistor 142 is connected between pin 3 of the timer IC 140 and pins 2 and 6 of the timer IC 140 tied together. Capacitor 144 is connected between pin 6 of the timer IC 140 and the common terminal 112. A bypass capacitor is connected between pin 5 of the timer IC 140 and the common terminal 112.

Continuing with FIG. 2, the low voltage output across the secondary winding 122 at nodes 170, 176 of transformer 116 is rectified by rectifier 172 connected in series with the node 170 of the secondary winding 122. The rectified output voltage is filtered by capacitor 178 connected between a positive node 174 and a negative (common) node 180. The node 180 is connected to the node 176 of the secondary winding 122. Persons skilled in the art will appreciate that the DC output voltage of the converter 100 is unregulated, and thus subject to variation as the AC input voltage varies. However, the regulation of the actual DC charging voltage applied to the battery pack during charging is regulated by another part of the electrical circuitry in the portable fluorescent lamp 10.

Figure 3:
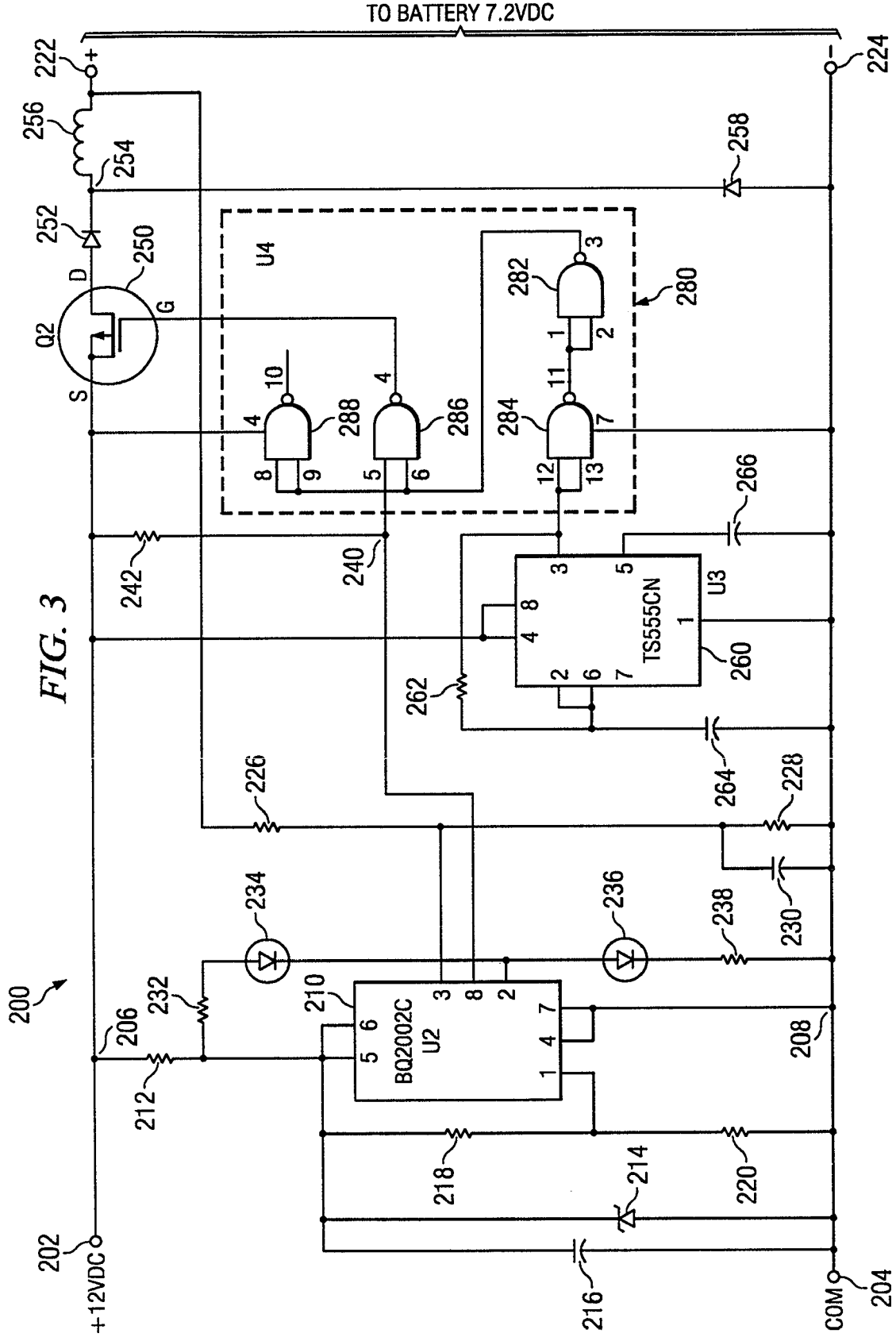
FIG. 3 illustrates an electrical schematic diagram of one embodiment of a battery charging circuit that may be used in the portable fluorescent lamp of FIG. 1.

Referring to FIG. 3, there is illustrated an electrical schematic diagram of one embodiment of a battery charging circuit that may be used in the portable fluorescent lamp of FIG. 1. The battery charging circuit 200 is essentially a DC-to-DC switching regulator controlled by a battery charging controller IC 210 responsive to a feedback signal from the DC voltage output. The switching regulator is driven by an a-stable timer IC oscillator 260 operating at 50 KHz, similar to that used in the converter circuit 100 described herein above. The output of the oscillator applied to the gate of an N-channel FET is gated by a logic circuit 280 controlled by the battery charging controller. The battery charging circuit 200 in the illustrative embodiment of FIG. 3 operates from a 12 to 14 VDC input and provides an output voltage of approximately 7.2 Volts while delivering a charging current of up to approximately 1.5 Amperes to the battery pack 52 or FIG. 1. The input voltage may be supplied from a converter operating from a 120 VAC voltage source as illustrated in FIG. 2 or from a 12 to 14 Volt battery such as an automotive battery.

The 12 VDC input is applied across the positive terminal 202 and the negative (common) terminal 204, which correspond respectively to nodes 206, 208. Connected in series between node 206 and a positive output terminal 222 are, in order, a P-channel MOSFET transistor switch 250, a rectifier diode 252, node 254, and inductor 256. The transistor switch 250 in the illustrative embodiment is a type FQB11P06 P-channel MOSFET rated at −60 Volts, −8.05 Amps, and having an Rds(on) of <0.175 Ohms. This device is available from Fairchild Semiconductor. Node 206 is connected to the source terminal of the transistor switch 250. The anode of diode 252 is connected to the drain terminal of transistor switch 250 and the cathode of the diode 252 is connected to node 254. The negative (common) output terminal 224 is connected to node 208. Another rectifier diode is connected between node 254 (cathode) and node 208 (anode). The three integrated circuits of FIGS. 3, 210, 260, and 280, are each connected between node 206, the Vcc supply, and node 208, the Vss common terminal.

Continuing with FIG. 3, the circuit of the battery charging controller 210, will now be described. The battery charging controller IC 210, in the illustrative embodiment, is a type bq2002C, a "NiCd/NiMH Fast-Charge Management IC" manufactured by Unitrode Corporation, a subsidiary of Texas Instruments, Dallas, Tex. In FIG. 3, a resistor 212 is connected between node 206 and pin 6 (the Vcc terminal) of the battery charging controller IC 210. Pin 5 (a temperature sense input) of controller IC 210 is connected to pin 6 of controller IC 210. Connected between pin 6 of controller IC 210 and node 208 are a 5.1 Volt zener diode 214, a bypass capacitor 216 and a first resistor 218 in series with a second resistor 220. The zener diode 214 sets the Vcc voltage for controller IC 210 at 5.1 Volts DC. The junction between the two resistors 218, 220, which form a resistive voltage divider, is connected to pin 1 of controller IC 210 to set the operating mode of the battery charging controller IC 210 ("charge timer, top-off, voltage termination mode, trickle rate," etc.). Pin 7 (the Vss terminal) of controller IC 210 is connected to the common node 208.

Also connected between pin 6 of controller IC 210 and node 208 is a network of light emitting diodes (LEDs) including resistor 232, LED 234, LED 236 and resistor 238, all connected in series. The junction of LEDs 234 and 236 is connected to pin 2 of controller IC 210. Pin 2 is the charging status output, which indicates whether the battery is being charged at a fast charge rate (steady red LED 234), or at a trickle rate (blinking red LED 234) or that the battery is fully charged (steady green LED 236). Pin 3 of controller IC 210, the battery voltage input, is connected through a resistor 226 to the positive output terminal 222. A resistor 228 and a bypass capacitor 230 are connected in parallel between pin 3 of controller IC 210 and the common node 208. Bypass capacitor 230 prevents the termination of charging on noise that may be present on the output terminal 222. Pin 8 of controller IC 210, the charge control output terminal, is connected to a node 240. A pull-up resistor 242 is connected between node 240 and node 206. The output signal at pin 8 of controller IC 210 is a logic high for fast charging, pulsed for trickle charging, and logic low when charging is not occurring.

Timing for the switching regulator circuit of the battery charging circuit 200 is provided by timer IC 260, a type 555 timer IC available from a variety of manufacturers. Vcc pin 8 of timer IC 260 is connected to node 206 and also to the Reset pin of timer IC 4 of U3 260. Vss pin 1 of timer IC 260 is connected to the common node 208. Timing resistor 262 is connected between the Q output pin 3 of U3 260 and the TR pin 2 of timer IC 260, which is also tied to the CV pin 6 of timer IC 260. The timing capacitor 264 is connected between pins 2,6 of timer IC 260 and the common node 208. Pin 5 of timer IC 260 is connected to the common node by capacitor 266. The timer IC 260, connected as an a-stable oscillator, provides a 50 KHz, 50% duty cycle pulse train at pin 3 for driving the transistor switch 250.

The pulse train signal from pin 3 of the timer IC 260 is gated to the transistor switch 250 by logic circuit 280 under the control of the charge control output from pin 3 of the battery charging controller IC 210. The logic circuit 280 may be a four stage NAND gate IC such as a type CD4093, which is available from a variety of manufacturers. Two stages of logic circuit 280, NAND gates 282 and 284, are connected in series with their inputs (respectively 1, 2 and 12, 13) tied together and the input (pins 1, 2) of NAND gate 282 tied to the output (pin 11) of NAND gate 284. This configuration provides an inverter/driver for the pulse train signal for the transistor switch 250. The output of NAND gate 282 at pin 3 is coupled to one input, pin 6, of NAND gate 286 of logic circuit 280, and also to pins 8, 9 of NAND gate 288 of logic circuit 280, whose output pin 10 is left floating. The other input of NAND gate 286 at pin 5 of logic circuit 280 is connected to the node 240, which is the charge control output of the battery charging controller IC 210. Thus, a logic high signal at node 240 (logic circuit 280 pin 5) enables the pulse train signal from NAND gate 282 at pin 3 to be coupled to the gate of the transistor switch 250.

Under the control of the 50 KHz, 50% duty cycle pulse train applied to the gate terminal of the transistor switch 250, the transistor switch 250 turns ON, and charging current flows through diode 252 and inductor 256 into the positive terminal of the battery pack connected to the positive output terminal 22 (see the battery pack 52 in FIG. 1). Also during this period, the charging current charges the inductor 256, building a magnetic field around the inductor 256. In the next period of the pulse train signal, the transistor switch 250 turns OFF, and current ceases to flow through diode 252. At this instant, the magnetic field surrounding the inductor 256 collapses, causing current to flow in the opposite direction through the inductor 256. At this time, the diode 258 is forward biased and the inductor delivers charging current through the diode 258 and into the negative terminal of the battery being charged, which is connected to the negative terminal of the battery charging circuit 200. In this way, charging current is delivered to the battery pack during both periods of the pulse train signal, when the transistor switch 250 is alternately in its ON and OFF states. Thus, the battery charging circuit 200 is operating "full time" to charge the battery pack.

Continuing with FIG. 3, a modification may be made to the battery charging circuit if it is intended to operate from an external DC power source such as a automotive storage battery the typically supplies 12.6 to 14.8 volts, depending on the state of charge and the load connected to the battery. The aforementioned battery voltage available is somewhat lower than the voltage provided by the converter circuit of FIG. 2. The modification, which provides a way to increase the duty cycle of the switching regulator, consists of connecting resistor 262 to the Vcc terminal, pin 8 of the timer IC 260 instead of to pin 3 of the timer IC 260, and adding a resistor from the junction of the resistor 262 and capacitor 264 to pin 7 of the timer IC 260. The value for this additional resistor is selected according to the duty cycle that is desired—the ratio of resistor 262 to the added resistor determines the duty cycle.

Figure 4:
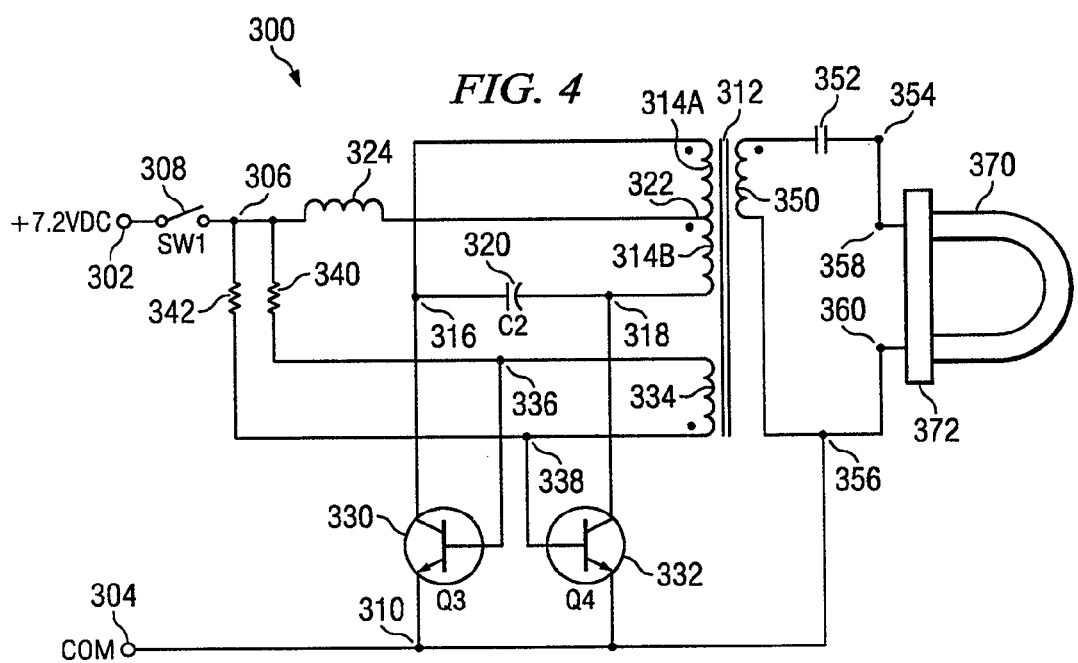
FIG. 4 illustrates an electrical schematic diagram of an embodiment of an electronic ballast circuit that may be used in the portable fluorescent lamp of FIG. 1.

Referring to FIG. 4, there is illustrated an electrical schematic diagram of one embodiment of an electronic ballast circuit 300 that may be used in the portable fluorescent lamp of FIG. 1. The ballast circuit 300 converts the 7.2 volts DC, supplied by battery pack 52 to the positive input terminal 302 and negative (common) input terminal 304, to a high frequency, high voltage AC signal. This high voltage signal, a 30 KHz square wave having a peak-to-peak amplitude of approximately 400 volts, is applied to the fluorescent bulb 370 to ionize the gas within the fluorescent bulb 370. The ballast circuit 300 includes a current limiting feature to limit the current in the bulb after the gas is ionized and the fluorescent bulb 370 begins producing light.

Connected between the positive input terminal 302 and a node 306 is a series-connected SPST switch 308 that is used to turn the fluorescent lamp ON and OFF. Switch 308 applies power to the ballast circuit 300. The negative input terminal is connected to a common node 310. A transformer 312 is configured to provide operating currents to a two-transistor, a-stable multivibrator or oscillator circuit and to step up the oscillator output voltage square wave to a value needed to start the ionization of the gas within the fluorescent bulb 370. Transformer 312 includes a center tapped primary winding 314A-314B, which is connected between nodes 316 and 318. Node 316 connects to the collector of bipolar transistor 330, which forms one side of the multivibrator circuit. Node 318 connects to the collector of an identical bipolar transistor 332, which forms the other side of the multivibrator circuit. A capacitor 320, which, in part, determines the operating frequency of oscillation of the a-stable multivibrator circuit, is connected between the nodes 316 and 318. The center tap of the primary winding 314A-314B, defined as node 322, is connected through an inductor to node 306. This inductor acts to prevent current spikes from the multivibrator when the transistors change states.

Continuing with FIG. 4, a second primary winding 334 of transformer 312 is connected between nodes 336 and 338. Nodes 336 and 338 connect to the supply voltage at node 306 through resistors 340 and 342 respectively. Nodes 336 and 338 provide bias current into the base terminals of transistors 330 and 332, respectively. The emitters of the bipolar transistors 330 and 332 are connected to the common node 310. Transistors 330 and 332, which are type KSD 1691G available from Fairchild Semiconductors, are chosen for their very high gain, hfe, and very low saturation voltage, Vsat. As is well known in the art, when voltage is applied to the input terminals 302, 304 of the multivibrator circuit, the imbalance between the two transistors' characteristics causes one of them to conduct current more quickly than the other, thus starting the oscillations of the a-stable multivibrator.

The output of the multivibrator 330, 332 is taken from the secondary winding 350 of transformer 312. The output signal is essentially a square wave having a frequency of approximately 30 KHz and a duty cycle of approximately 50%. The amplitude of the signal across the secondary winding 350 is approximately 400 volts peak to peak. One leg of the secondary winding is connected via a series capacitor 352 to a node 354. The other leg of the secondary winding 350 is connected to a node 356, which is also connected to the common node 310. Nodes 354 and 356 are respectively connected to the terminals 358, 360 of the receptacle for the bi-pin fluorescent bulb 370. The fluorescent bulb 370 includes a base 372 containing the bi-pin terminals that plug into the receptacle terminals 358, 360.

It is well known that once the gas within a fluorescent bulb has become ionized, the bulb presents a negative impedance characteristic to the external circuitry connected to the terminals of the bulb. That is, once the bulb begins to conduct, the current will continue to increase without bound until the bulb is destroyed unless the current is limited to a safe value. In a conventional fluorescent lamp that is controlled by a conventional ballast, the ballast provides a large inductive impedance to the alternating current flowing in the lamp. In the illustrative ballast circuit of the present invention, the transformer 312 is designed with an air gap in the core so that a substantial inductive impedance appears in series with the current flowing in the secondary winding 350 and the fluorescent bulb 370.

Referring to FIG. 5, there is illustrated a pictorial drawing of one embodiment of a portable fluorescent lamp 400 according to the present invention. The portable fluorescent lamp 400 includes a tubular housing 432 having a handle grip (or body) portion 402 at the lower end and a cylindrical lens portion 404 at the upper end. The cylindrical lens portion may be fabricated of a material that readily transmits light, and may further be configured to transmit light in all directions—i.e., 360 degrees-surrounding the longitudinal axis of the cylindrical lens portion 404. Enclosed within the cylindrical lens portion 404 is a bi-pin fluorescent bulb 406 that is plugged into a receptacle base 408 inside the cylindrical lens portion 404. Along the back side of the cylindrical lens portion 404 is a tubular spine 410, which mechanically connects the handle grip portion 402, the cylindrical lens portion 404 and an end cap 412 together. The tubular spine, which may have a somewhat flattened oval or rectangular cross-section, strengthens the structure of the portable fluorescent lamp 400 assembly to prevent breakage if the lamp 400 is dropped. The spine 410 serves to provide the additional stiffness to the lamp 400, which is required because of the 8 to 10 degree offset of the cylindrical lens portion 404 relative to the handle grip portion 402 of the lamp 400. The offset is built in to the tubular housing 432 so that when the lamp 400 is stood on its battery pack 500, which serves as a base, the illumination from the lamp is directed downward toward the work surface. The tubular spine also provides space for circuitry to accommodate additional features such as a flashing light circuit, a circuit to drive indicator lights showing the status of the electrical circuitry and/or the batteries, etc.

The battery pack 500, which will be described in detail herein below, is secured to the lamp 400 by a pair of opposing mandible jaws, of which the jaw release button 506 of one of the mandible jaws is shown in FIG. 5. As the battery pack is brought into position against the bottom of the handle grip portion 402, the jaws, having some built-in resilience to allow bending from a rest position, are inserted into slots in the handle grip portion 402 and snapped into place. The resilience is a property of the plastic material used to fabricate the handle grip portion 402 and the housing of the battery pack 500.

It will be appreciated that the battery pack 500, when attached to the tubular housing 432 acts as a substantial base for the portable fluorescent lamp 400, because of its mass (due to the batteries) and because the bottom of the battery pack 400 may be flat to provide a stable base. Alternatively, the bottom of the base may also be configured as a dual-plane surface. In this case, the bottom surface may comprise two separate planes, joined at a central location on the bottom surface, and which differed angularly from each other, enabling the lamp 400 to be positioned upright at two different angles. For example, one angle could be set slightly downward for greater illumination near the lamp and the other angle, which differed by only 5 to 10 degrees or so, would be useful for illuminating broader areas. Persons skilled in the art will further realize that the angle of illumination may be varied in other ways, such as incorporating a pivot, e.g., near the midpoint of the structure of the portable fluorescent lamp. Also shown in FIG. 5 along the back of the handle grip portion 402 is a receptacle 424 for an AC line cord (not shown) to be used when operating the lamp 400 from an AC voltage source.

In an alternate embodiment not illustrated in FIG. 5, a receptacle for connecting a power cord to connect the lamp 400 to a DC voltage source such as an automotive battery supply may be included on the handle grip portion 402 of the tubular housing. It is feature of the portable fluorescent lamp 400 of the present invention that the inclusion of a battery charging circuit operative from a nominal 12 VDC supply enables the lamp 400 to be operated from a 12 VDC source as readily as from a 120 VAC source. The selection of voltage source, 120 VAC or 12 VDC, the selection may be made by merely changing the AC line cord or the DC power cord, or by an extra switch is described in conjunction with FIG. 1, which may be installed on the handle grip portion 402 of the tubular housing 432.

Referring to FIG. 6, there is illustrated an exploded pictorial view of one embodiment of a battery pack 500 for use with the portable fluorescent lamp of FIG. 5. The battery pack 500, fabricated of molded plastic material, includes a bottom pan 502 having a pair of opposing mandible jaws 504 ("jaws 504") molded integral with the bottom pan 502 and on opposite sides of the base 502. The jaws 504 are oriented in a vertical direction, perpendicular to the bottom pan 502 and configured such that they are resilient when bent during installation or removal of the battery pack 500 onto or from the tubular housing 432 of the portable fluorescent lamp 400 of FIG. 5. The outer surface of the jaws 504 include a ridged button 506 for use in deflecting the jaws 504 to remove the battery pack 500 from the portable fluorescent lamp 400 as will be described further herein below.

The bottom pan 502 of the battery pack 500 is further configured to receive a plurality of batteries assembled as a cell pack 510. Disposed above the cell pack 510 is a retainer plate 512 for securing and positioning a pair of battery terminals 514. The terminals 514 are installed in recesses 516 molded into the retainer plate 512. One terminal 514 may be designated a positive terminal and connected to the positive terminal of the cell pack 510 and the other would be designated a negative terminal 514 to be connected to the negative terminal of the cell pack 510.

The battery pack 500 further includes a top cover 520 that includes a docking plate 530, wherein the top cover fits over and encloses the cell pack 510 and retainer plate 512 when installed and secured to the bottom pan 502 using the resilient locking tabs 522 disposed near each corner of the bottom pan 502. The top cover 520 includes openings 524 disposed on two opposite sides of the top cover 520 through which pass the opposing mandible jaws 504. The top cover 520 also includes two contact openings 526 disposed in the docking plate 530 to expose and permit access to the positive and negative terminals 514 connected to the cell pack 510. The contact openings 526 function to locate the positive and negative terminals 514 such that they make contact with corresponding terminals in the lower end of the handle grip portion of the tubular housing 432 containing the electrical circuitry when the battery pack 500 is assembled to the tubular housing 432 of the portable fluorescent lamp 400.

Figure 7:
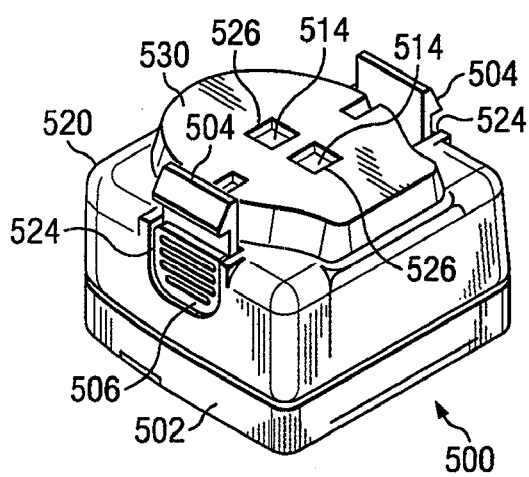
FIG. 7 illustrates a pictorial view of an assembled battery pack for use with the portable fluorescent lamp of FIG. 5.

Referring to FIG. 7, there is illustrated a pictorial view of an assembled battery pack for use with the portable fluorescent lamp of FIG. 6. The reference numbers for the figure are the same as those of FIG. 6 (or a lower numbered figure) and they refer to the same structures. The battery pack includes a bottom pan 502 assembled to a top cover 520 with the pair of opposing mandible jaws 504 protruding through the openings 524 in the top cover 520, and exposing the ridged buttons 506 to view. The ridged buttons 506, disposed on opposite sides of the battery pack 500, are pressed toward each other to release the opposing mandible jaws 504 from corresponding jaw catches (not shown) inside the lower end of the handle grip portion 402 of the tubular housing 432. In FIG. 7, the assembled battery pack 500 further illustrates the docking plate 530 having the contact openings 526 and the positive and negative terminals 514 of the cell pack 510 visible therethrough.

Figure 8:
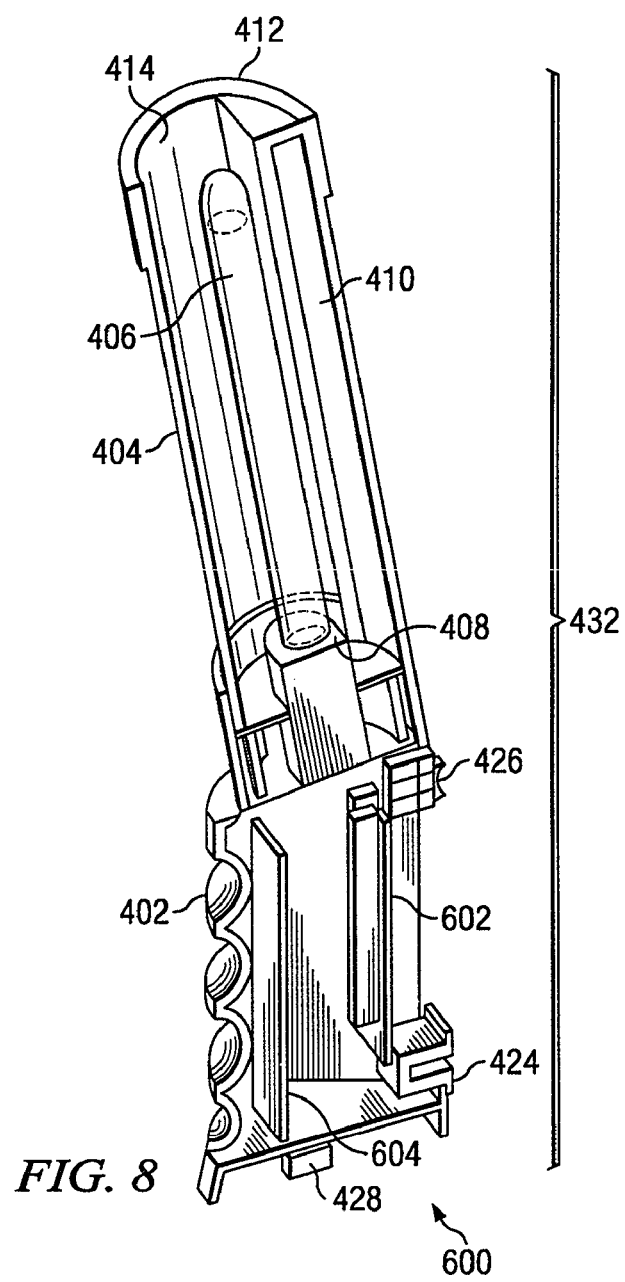
FIG. 8 illustrates a partially cut-away pictorial view of the interior of the embodiment of the portable fluorescent lamp of FIG. 5.

Referring to FIG. 8, there is illustrated a partially cut-away pictorial view of the interior of the embodiment of the portable fluorescent lamp of FIG. 5. The illustration depicts a half shell 600 of the tubular housing 432 of the portable fluorescent lamp 400 of FIG. 5, and includes one half of the handle grip portion 402, the lens portion 404, the fluorescent bulb 406, the receptacle 408 for the fluorescent bulb, the tubular spine 410, and the end cap 412. The space above the lens portion 404 but within the end cap 412 is designated as reference number 414. This space is available for additional features of the lamp 400, which may include, for example, individual light indicators, spotlights or flashing lights, a hook for hanging the lamp 400, a switch for an added electrical function, a magnet for supporting the lamp 400, and the like.

Further, the cut-away view of FIG. 8 illustrates one arrangement of substrates such as printed circuit boards for the electrical circuitry (See FIGS. 1-4) used in the illustrative embodiment. For example, a first circuit board 602 may contain and support the circuits of FIGS. 2 and 4, the 120 VAC converter and fluorescent ballast circuits respectively. Similarly, a second circuit board 604 may contain and support the battery charging circuit of FIG. 3. Other configurations are certainly possible, depending upon the particular architecture of the portable fluorescent lamp 400 of the present invention. Also shown in FIG. 8 are the receptacle 424 for the AC line cord (not shown) and the ON/OFF switch 426 for the lamp 400. The receptacle 424 and the switch 426 and a battery pack terminal 428 are also shown in FIG. 5.

While the invention has been shown in only one of its forms, it is not thus limited but is susceptible to various changes and modifications without departing from the spirit thereof. For example, the compact, efficient architecture of the portable, rechargeable fluorescent lamp 400 disclosed herein is readily adaptable to higher power fluorescent bulbs with relatively little increases in size and weight of the end product. Further, the lamp design permits use with interchangeable battery packs and/or battery chargers. Moreover, as described previously, the lamp may be configured for operation from both AC and DC power sources, or from either one alone. In an AC operated lamp, the AC line cord may be replaced with an AC line plug designed to fit a standard 120 VAC wall outlet. In this configuration the portable fluorescent lamp 400 of the present invention may then be used as a power failure emergency light that would remain fully charged and provide auxiliary lighting, either while plugged in to the outlet or while carried around as a portable lamp.

Additional features may be included or modifications made in designs adapted to specific needs. As examples, the cylindrical lens portion 404 may be transparent or translucent. Translucent versions may be colored white or any of several other colors according to particular uses contemplated for the portable fluorescent lamp 400. In an alternative embodiment, the cylindrical lens portion 404 may be configured to be interchangeable so that different colors or illumination properties may be conveniently provided. In yet other embodiments, the lens portion 404 may have cross-sections other than cylindrical, being, for example, square or rectangular, pentagonal or hexagonal, and so on. Reflectors may be incorporated within or outside the lens portion 404 to direct the light from the fluorescent bulb in predetermined directions or to shape or focus the light in particular predetermined ways. Such reflectors may further be interchangeable.

It is further contemplated that the handle grip portion 402 may have other shapes or other surface finishes to permit other kinds of gripping features than the illustrative embodiment described herein above. The handle grip portion 402 or other parts of the tubular housing 432 may include eyelets to enable supporting the portable fluorescent lamp from a lanyard or hook or other tether device. Certain applications may include structural features to make the tubular housing 432 gas tight or water tight and/or to incorporate other features such as buoyant means to enable the portable fluorescent lamp 400 to float in water or to be used while immersed, as in marine applications. The tubular spine 410, being hollow, includes space for additional circuitry or for relocating the electrical circuitry from the handle grip portion 402 of the tubular housing 432. In the latter case, the batteries may then be located in the handle grip portion of the lamp, enabling a reduction in the size of the lamp. The implementation of all such features and modifications are well within the skills of persons skilled in the art, as will readily be appreciated.

What is claimed is:

1. A battery operated portable fluorescent lamp, comprising:

an elongated tubular housing having a handle grip at a first end and a substantially cylindrical lens proximate a second end, wherein said first end is adapted to couple to a battery pack and said lens is adapted to enclose a miniature fluorescent bulb;

an electrical circuitry, enclosed within the handle grip and alternately operable from either a 120 VAC voltage source or a 12 VDC voltage source, the electrical circuitry including a converter circuit, a separate battery charging circuit, and a fluorescent lamp ballast circuit having an output coupled to the fluorescent bulb enclosed within the lens; and a battery pack, coupled to the first end of the tubular housing and operable to simultaneously receive charging current from an output of the charging circuit and to deliver DC supply voltage to the fluorescent lamp ballast circuit without the occurrence of a net discharge of the battery pack.

2. The apparatus of claim 1, wherein an input of the charging circuit is coupled to an output of the converter circuit and an input of the ballast circuit is coupled to an output of the charging circuit.

3. The apparatus of claim 1, wherein the converter circuit, operable to convert 120 VAC to 12 VDC, comprises a feed forward converter operating at a frequency of approximately 50 KHz.

4. The apparatus of claim 1, wherein the charging circuit, operable to provide charging current to the battery pack and to provide operating voltage to the ballast circuit, comprises a switching regulator having a FET switch operating at approximately 50 KHz.

5. The apparatus of claim 1, wherein the charging circuit further comprises at least one of a first LED indicator for indicating a fully charged battery pack and a second LED indicator for indicating fast charge operation.

6. The apparatus of claim 5, wherein the second LED indicator further indicates a trickle charge operation.

7. The apparatus of claim 5, wherein the first LED indicator emits green light.

8. The apparatus of claim 5, wherein the second LED indicator emits red light.

9. The apparatus of claim 4, wherein the switching regulator comprises a gated timing circuit for controlling the FET switch.

10. The apparatus of claim 1, wherein the ballast circuit comprises a transformer-coupled, push-pull converter having a step up output.

11. The apparatus of claim 1, wherein the battery pack comprises:
   an enclosure formed as a base for the elongated tubular housing and containing a plurality of rechargeable battery cells coupled to at least a positive terminal and a negative terminal of the battery pack; and
   a pair of opposing mandible clamps formed integral with the enclosure and on opposite sides of the enclosure for lockably engaging corresponding openings disposed on the first end of the tubular housing, such that the positive terminal and the negative terminal of the battery pack are placed in contact with corresponding positive and negative terminals of the electrical circuitry in the tubular housing when the enclosure is secured to the first end of the tubular housing with the pair of opposing mandible clamps.

12. The apparatus of claim 11, wherein the plurality of rechargeable cells are connected in series.

13. The apparatus of claim 11, wherein the plurality of rechargeable cells are connected in a series-parallel combination.

14. The apparatus of claim 11, wherein the plurality of rechargeable cells are connected in parallel.

15. The apparatus of claim 11, wherein the rechargeable cells are nickel-metal-hydride battery cells.

16. The apparatus of claim 11, wherein the battery capacity of the plurality of rechargeable cells is at least approximately 2000 milliAmpere-hours.

17. The apparatus of claim 1, wherein the battery pack comprises:
   an enclosure formed as a base for the elongated tubular housing and containing a single rechargeable battery cell coupled to at least a positive terminal and a negative terminal of the battery pack; and
   a pair of opposing mandible clamps formed integral with the enclosure and on opposite sides of the enclosure for lockably engaging corresponding openings disposed on the first end of the tubular housing, such that the positive terminal and the negative terminal of the battery pack are placed in contact with corresponding positive and negative terminals of the electrical circuitry in the tubular housing when the enclosure is secured to the first end of the tubular housing with the pair of opposing mandible clamps.

18. The apparatus of claim 17, wherein the battery capacity of the single rechargeable cell is at least approximately 2000 milliAmpere-hours.

19. The apparatus of claim 11, wherein the enclosure of the battery pack further comprises:
   a bottom pan having the opposing mandible jaws integrally molded therewith;
   a retainer plate disposed proximate an upper side of the plurality of rechargeable cells for retaining the positive and negative terminals of the battery pack in a fixed position to engage with the corresponding positive and negative terminals of the electrical circuitry in the tubular housing when the battery pack is assembled to the tubular housing of the portable fluorescent lamp; and
   a top cover having a docking plate for receiving the first end of the tubular housing, a pair of openings disposed in opposite sides of the top cover to allow passage of the opposing mandible clamps therethrough, and first and second openings in the docking plate to expose the positive and negative terminals respectively of the battery pack, wherein the top cover is configured with latching prongs to secure it to the bottom pan when the top cover and the bottom pan are assembled together.

* * * * *

UNITED STATES PATENT AND TRADEMARK OFFICE
CERTIFICATE OF CORRECTION

| | | |
|---|---|---|
| PATENT NO. | : 7,841,735 B2 | Page 1 of 1 |
| APPLICATION NO. | : 12/200097 | |
| DATED | : November 30, 2010 | |
| INVENTOR(S) | : James Newton et al. | |

It is certified that error appears in the above-identified patent and that said Letters Patent is hereby corrected as shown below:

On Page 1, in the Abstract, line 6, please remove the numerals 3030 after the word "cylindrical".

Signed and Sealed this
Fifteenth Day of February, 2011

David J. Kappos
*Director of the United States Patent and Trademark Office*